United States Patent
Feng

(10) Patent No.: US 8,422,346 B2
(45) Date of Patent: Apr. 16, 2013

(54) METHOD AND APPARATUS FOR DETERMINING THE NUMBER OF DATA LAYERS IN AN OPTICAL DISC

(75) Inventor: Wen-Chun Feng, Taipei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 132 days.

(21) Appl. No.: 13/100,958

(22) Filed: May 4, 2011

(65) Prior Publication Data

US 2011/0310717 A1    Dec. 22, 2011

(30) Foreign Application Priority Data

Jun. 18, 2010  (TW) .............................. 99119965 A

(51) Int. Cl.
*G11B 15/04*        (2006.01)
(52) U.S. Cl.
USPC ......................................... 369/53.22; 369/94

(58) Field of Classification Search .................. None
See application file for complete search history.

(56) References Cited

U.S. PATENT DOCUMENTS

| | | | |
|---|---|---|---|
| 7,842,366 B2* | 11/2010 | Ichimura | 428/64.1 |
| 2008/0080345 A1* | 4/2008 | Hasegawa | 369/53.2 |
| 2008/0165667 A1* | 7/2008 | Otsuka et al. | 369/275.1 |
| 2008/0181062 A1* | 7/2008 | Kim et al. | 369/44.28 |
| 2009/0067299 A1* | 3/2009 | Chun | 369/44.23 |
| 2009/0303847 A1* | 12/2009 | Ishikawa et al. | 369/44.32 |

\* cited by examiner

*Primary Examiner* — Paul Huber
(74) *Attorney, Agent, or Firm* — WPAT PC; Justin King

(57) ABSTRACT

The present invention provides a method and an apparatus for determining the number of data layers in an optical disc. Firstly, the objective lens of the optical pickup head is controlled so that it moves toward the optical disc. At the same time, a generated SBAD signal is recorded. The number of wave peaks in the SBAD signal is then detected and the number of the data layers in an optical disc is determined according to the detected number of wave peaks in the SBAD signal.

16 Claims, 7 Drawing Sheets

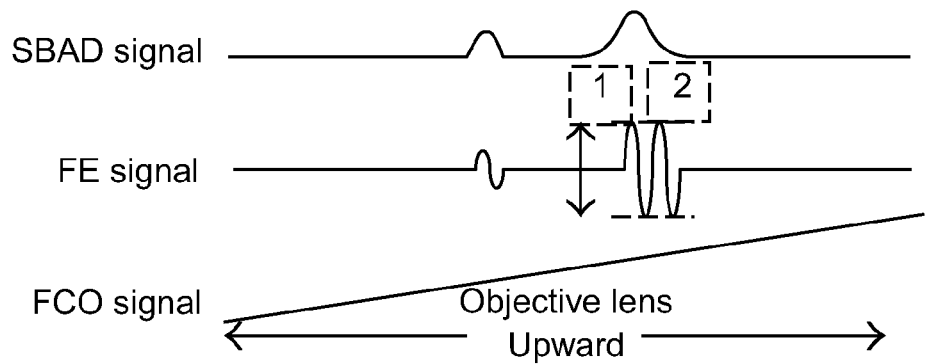
FIG.1 (Prior Art)
| Spot Size | $\lambda/(NA)$ |
|---|---|
| Focus depth | $(\lambda/(NA)^2)$ |
| Astigmatism by Thickness | $\Delta d * (NA)^4/\lambda$ |
FIG.2 (Prior Art)
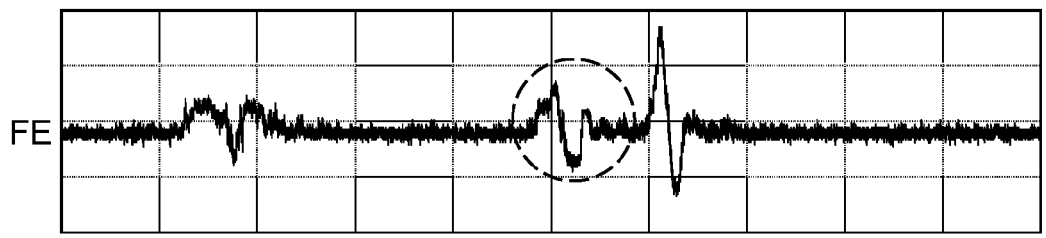
FIG.3 (Prior Art)

METHOD AND APPARATUS FOR DETERMINING THE NUMBER OF DATA LAYERS IN AN OPTICAL DISC

This application claims the benefit of Taiwan application Serial No. 099119965, filed Jun. 18, 2010, the subject matter of which is incorporated herein by reference.

FIELD OF THE INVENTION

The present invention relates to a method and an apparatus for determining the number of data layers in an optical disc, and more particularly to a method and an apparatus for determining the number of data layers in a blu-ray optical disc.

BACKGROUND OF THE INVENTION

A conventional optical disc drive determines the number of data layers in an optical disc by means of a focus error signal. Please refer to FIG. 1, which is a diagram showing relative signals generated by the optical disc drive when detecting a DVD double layer disc. When the optical disc drive starts detecting data layers of the optical disc, the optical disc drive controls objectives lens of an optical pickup head upward and toward the optical disc, and a s-curve with smaller magnitude which represents a substrate layer appears. Afterward, if the focus error signal appears two s-curves, the optical disc drive thus determines that the detected optical disc is a double layer disc. On the contrary, if the focus error signal only appears a single s-curve, the optical disc drive determines the detected optical disc is a single layer disc.

However, the method for determining the number of data layers in an optical disc by means of s-curve fails easily when detecting a blu-ray disc. The reason why the conventional optical drive easily fails to determine the number of data layers in a blu-ray disc is described below.

In order to increase data density, the optical disc of an optical disc drive is equipped with a blu-ray (BD) laser in addition to a conventional CD laser and a conventional DVD laser. The wavelength λ of the BD laser is 405 nm while the wavelength λ of the DVD laser is 650 nm. Moreover, the numerical aperture NA of the BD laser is 0.85 while the numerical aperture NA of the DVD laser is 0.6. In other words, then BD laser has shorter wavelength and higher numerical aperture (NA) compared to the DVD laser. Please refer to FIG. 2, which is a table showing optical coefficients of the laser of an optical system and relative parameters. From the table we know, the spot size of the BD laser is smaller, data density is thus increased efficiently. However, the optical system is also more sensitive to the thickness variation of the optical disc Δd due to the design of the BD laser. The effect dueo to spherical aberration is proportional to four power of exponent of the numerical aperture NA. When the optical system adopts the BD laser reading/writing the optical disc, the effect due to spherical aberration cannot be neglected because the numerical aperture NA of the BD laser is higher.

Please refer to FIG. 3, which is a diagram showing the waveform of the practical focus error signal FE when a conventional optical disc drive reading a blu-ray double layer disc. When detecting a blu-ray disc, the quality of the focus error signal is getting worse due to the spherical aberration resulted from the thickness variation of each data layers in a blu-ray disc. The focus error signal is shrank and distorted as shown in dash line of the FIG. 3. The s-curve of the focus error signal is badly distorted. If the conventional method for determined the number of data layers is adopted, the optical disc drive will probably detect the blu-ray disc erroneously because the optical disc drive cannot recognize the actual number of s-curves which may represent the number of data layers in the optical disc. In addition, the blu-ray double layer disc or blu-ray multi-layer disc will be popularized because the requirement for 3D films. If the number of data layers in a blu-ray disc cannot be detected efficiently which results in the difficulties of adjusting servo signals, the disc reading speed will be delay and even read fail. Therefore, How to determine the number of data layers in a blu-ray disc efficiently is the subject matter of the present invention.

SUMMARY OF THE INVENTION

Therefore, the object of the present invention is to provide a method for determining the number of data layers in an optical disc. In the method, the number of data layers in a blu-ray disc is determined accurately so that the read/write quality of the optical disc drive is enhanced.

An embodiment of the present invention provides a method for an optical disc drive determining data layers in an optical disc comprises the below steps. An objective lens of the optical disc drive is moved and a detection signal is generated. The number of wave peaks appeared in the detection signal is counted and the number of data layers in the optical disc is determined based on the number of wave peaks in the detection signal.

Another embodiment of the present invention provides an apparatus for determining data layers in an optical disc which comprises an optical pickup head which has an objective lens and a photo detector, an control unit which is connected to the optical pickup head for controlling the objective lens moving, receiving a electrical signal from the photo detector and outputting a detection signal, a SBAD counter for counting the number of wave peaks appeared in the detection signal, and a logical operation unit for determining the number of data layers in the optical disc according the counting result of the SBAD counter.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 (prior art) is a diagram showing relative signals generated by the optical disc drive when detecting a DVD double layer disc.

FIG. 2 (prior art) is a table showing optical coefficients of the laser of an optical system and relative parameters.

FIG. 3 (prior art) is a diagram showing the waveform of the practical focus error signal FE when a conventional optical disc drive readsing a blu-ray double layer disc.

DETAILED DESCRIPTION OF PREFERRED EMBODIMENTS

Figure 4:
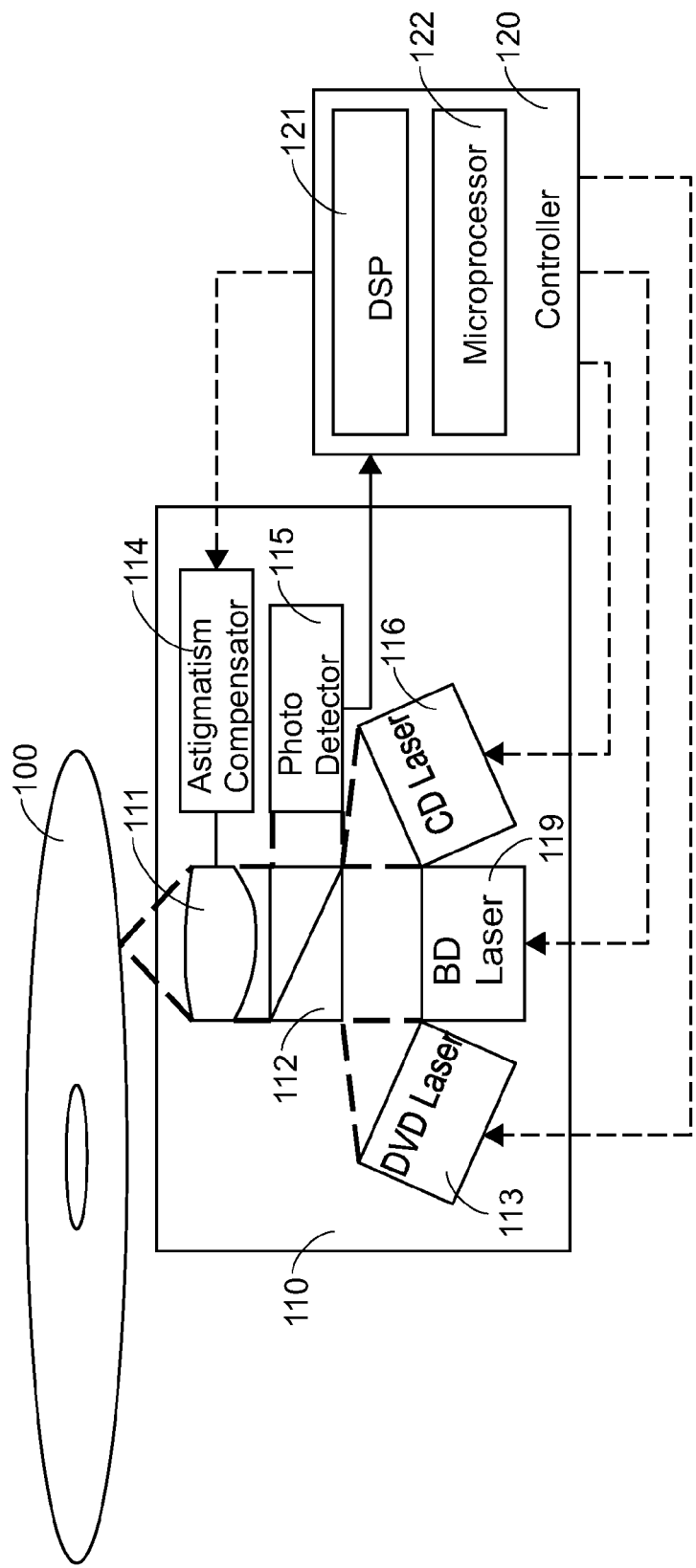
FIG. 4 is an optical disc drive according to the present invention.

Please refer to FIG. 4, which illustrates an optical disc drive according to the present invention. The optical pickup head 110 comprises a blu-ray (BD) laser light source 119, a DVD laser light source 113 and a CD laser light source 116 which provides for reading different kinds of discs. The BD laser light source 119, the DVD laser light source 113 and the CD laser light source 116 passes through a collimator 112 and an objective lens 111 and then focuses on data layer of the optical disc 100. The reflected laser light projects on the light detectors 115 which transfer the light signal into an electrical signal. The electrical signal is then calculated by the digital signal processor (DSP) 121 of the controller 120, and thus a focus error signal (FE), sub beam adder signal (SBAD) and radio frequency signal (RF) are acquired. Wherein the controller 120 controls turning on/off the BD laser light source 119, the DVD light source 113 and the CD light source 116. The controller 120 also controls a focus activator (560 of FIG. 5) driving the objective lens 111 to the optimal focus spot with the aid of a driving motor. Moreover, an astigmatism compensated value is inputted to an astigmatism compensator 114 so that the read/write quality of the optical storage system is improved. Therefore, the optical storage system may maintain the best read/write quality.

Figure 5:
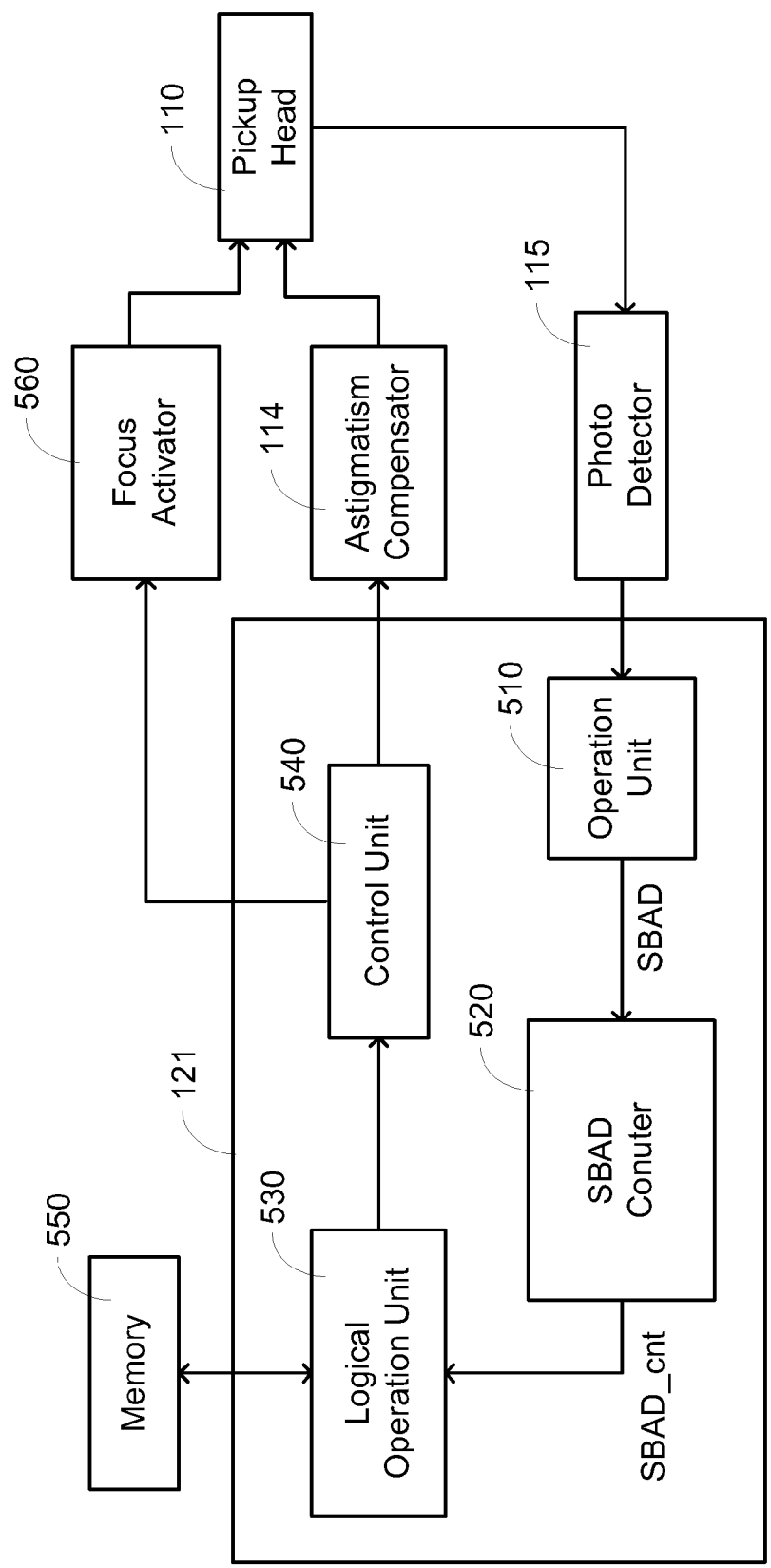
FIG. 5 is a block diagram of internal circuits inside the digital signal processor (DSP) 121 according to the present invention.

Please refer to FIG. 5, which illustrates a block diagram of internal circuits inside the digital signal processor (DSP) 121 according to the present invention. Firstly, when the optical disc drive reads an optical disc 100, the control unit 540 outputs a control signal to the focus activator 540 and a astigmatism compensator 114 according to the process of determining the number of data layers in an optical disc. The photo detector 115 outputs ABCD signals to the operation unit 510 according to the reading result, and a detection signal (i.e. a sub beam adder signal SBAD (A+B+C+D)) is generated by the operation unit 510. Then, SBAD counter 520 counts the number of the SBAD wave peak and the logical operation unit 520 determines the number of data layers in the optical disc according to the counting result of the SBAD counter 520. It is to be noted that the operation unit 510, control unit 540, logical operation unit 530 and SBAD counter 520 can be realized with software in the DSP 121. In addition, a skilled person in the art may replace the detection signal with a radio-frequency signal (RF) which has similar characteristic with SBAD signal to accomplish the present invention. The detail description about RF signal is thus omitted.

According to the embodiment of the present invention, the SBAD signal will show two distinct wave peaks when the optical disc drive reads a blu-ray double layer disc due to that the BD laser has very short focus depth. And the number of data layers in an optical disc is easily determined with the aid of setting a voltage threshold $V_{th}$.

Figure 6A:
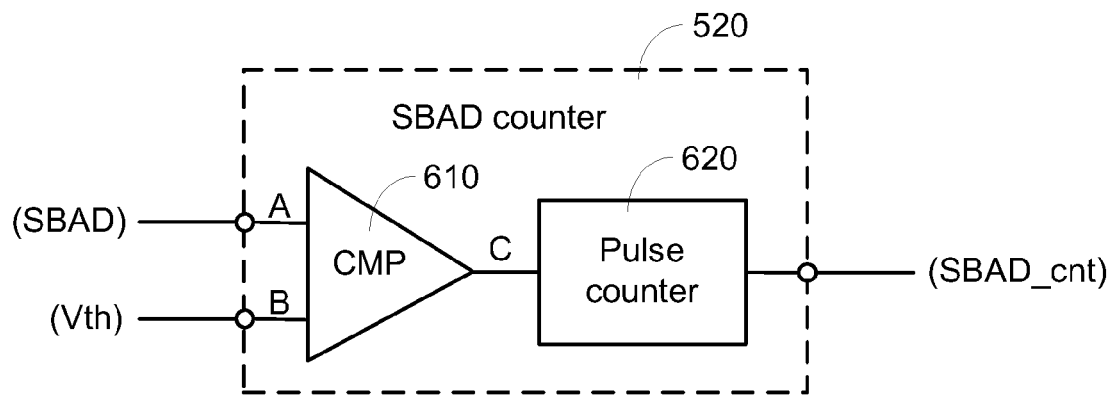
FIG. 6A illustrates an internal circuit of the SBAD counter 520 according to the present invention.

Please refer to FIG. 6A, which illustrates an internal circuit of the SBAD counter 520 according to the present invention. The SBAD counter 520 comprises a comparator 610 and a pulse counter 620. The comparator 610 has input terminals A and B, and an output terminal C wherein the input terminal A is coupled to a SBAD signal outputted by the operation unit 510, the input terminal B is coupled to a predetermined threshold voltage $V_{th}$ and the output terminal C is coupled to a pulse counter 620. The output terminal C output a high level voltage when the comparator determines that the voltage of the input terminal A is higher than that of the input terminal B. On the other hand, the output terminal C output a low level voltage when the comparator determines that the voltage of the input terminal A is less than that of the input terminal B. Moreover, the pulse counter 620 counts the number of pulses detected in the output terminal C, the number of wave peaks in the SBAD signal is thus counted.

Figure 6B:
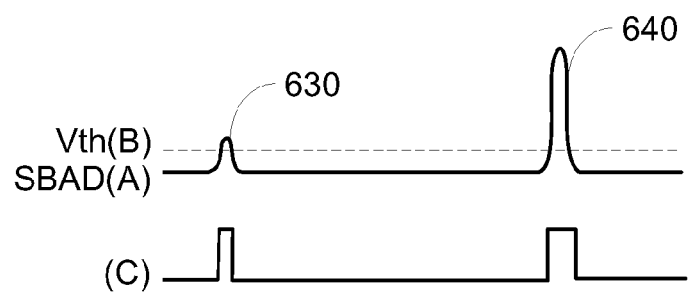
FIG. 6B-C illustrate relative signals when the optical disc drive read a single layer disc and a double layer disc respectively.
Figure 6C:
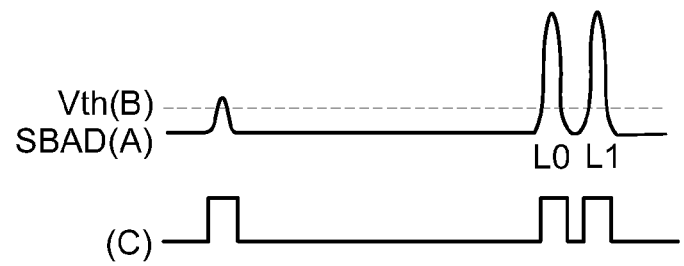

Please refer to FIG. 6B and FIG. 6C, which illustrate relative signals when the optical disc drive read a single layer disc and a double layer disc respectively. When the optical disc drive reads/writes an optical disc, the pickup head firstly sweep the substrate layer which results in a small wave peak 630 appeared in the SBAD signal and then detects a first data layer L0 and a second data layer L1. When the optical pickup head detects the first data layer L0, a bigger wave peak 640 appeared in the SBAD signal. Therefore, by counting the number of wave peaks in the SBAD signal, the number of data layers in the optical disc can be determined. Thus we may conclude that FIG. 6B shows signals when the optical disc drive reads a single layer disc while FIG. 6C show signals when the optical disc drive reads a double layer disc.

It is to be noted that the circuit diagram in FIG. 6A is only a simplified diagram. The function of the SBAD counter 520 can also be realized in DSP 121 with logical computation way. So the optical disc drive determines the number of data layers according to the number of SBAD wave peaks. The invention can not only be applied for determining whether a blu-ray disc is a single layer disc or a double layer disc, but also can be applied for determining a multi-layer blu-ray disc.

Figure 7:
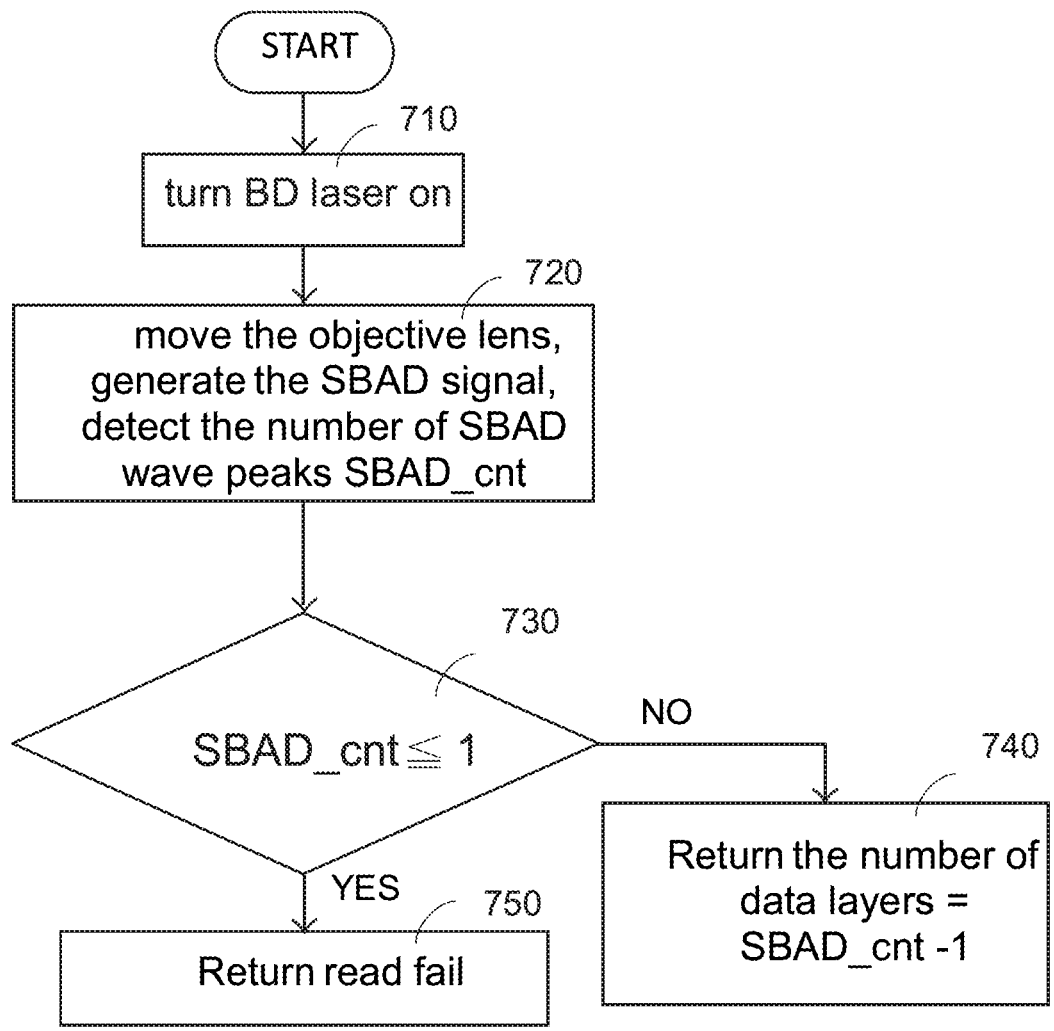
FIG. 7 illustrates a flow chart of the method for determining the number of data layers in an optical disc according to the present invention.

Therefore, the number of data layers in an optical disc can be determined according to the counting result of wave peaks in the SBAD signal. Please refer to FIG. 7, which illustrates a flow chart of the method for determining the number of data layers in an optical disc according to the present invention.

Step 710: turn on a BD light source.

Step 720: move the objective lens, generate the SBAD signal and detect the number of SBAD wave peaks SBAD_cnt.

Step 730: determine the number of data layers in an optical disc according to the number of SBAD wave peaks SBAD_cnt. If the number of SBAD wave peaks SBAD_cnt is less than 1, proceed step 750, or else proceed step 740.

Step 740: return the number of data layers in an optical disc is equal to the number of SBAD wave peaks SBAD_cnt minus 1.

Step 750: return read fail to the optical disc drive.

When the number of SBAD wave peaks SBAD_cnt is less or equal to 1 which represents that the optical disc contains no data layers, the optical disc drive thus returns a read fail message (step 730 and step 750). On the other hand, when the number of SBAD wave peaks SBAD_cnt is larger than 1, the number of data layers in an optical disc is equal to the number of SBAD wave peaks SBAD_cnt minus 1, which excludes the factor of that a small wave peak appeared in the SBAD signal when the optical disc drive detects a substrate layer of the optical disc (step 730 and step 740).

Figure 8:
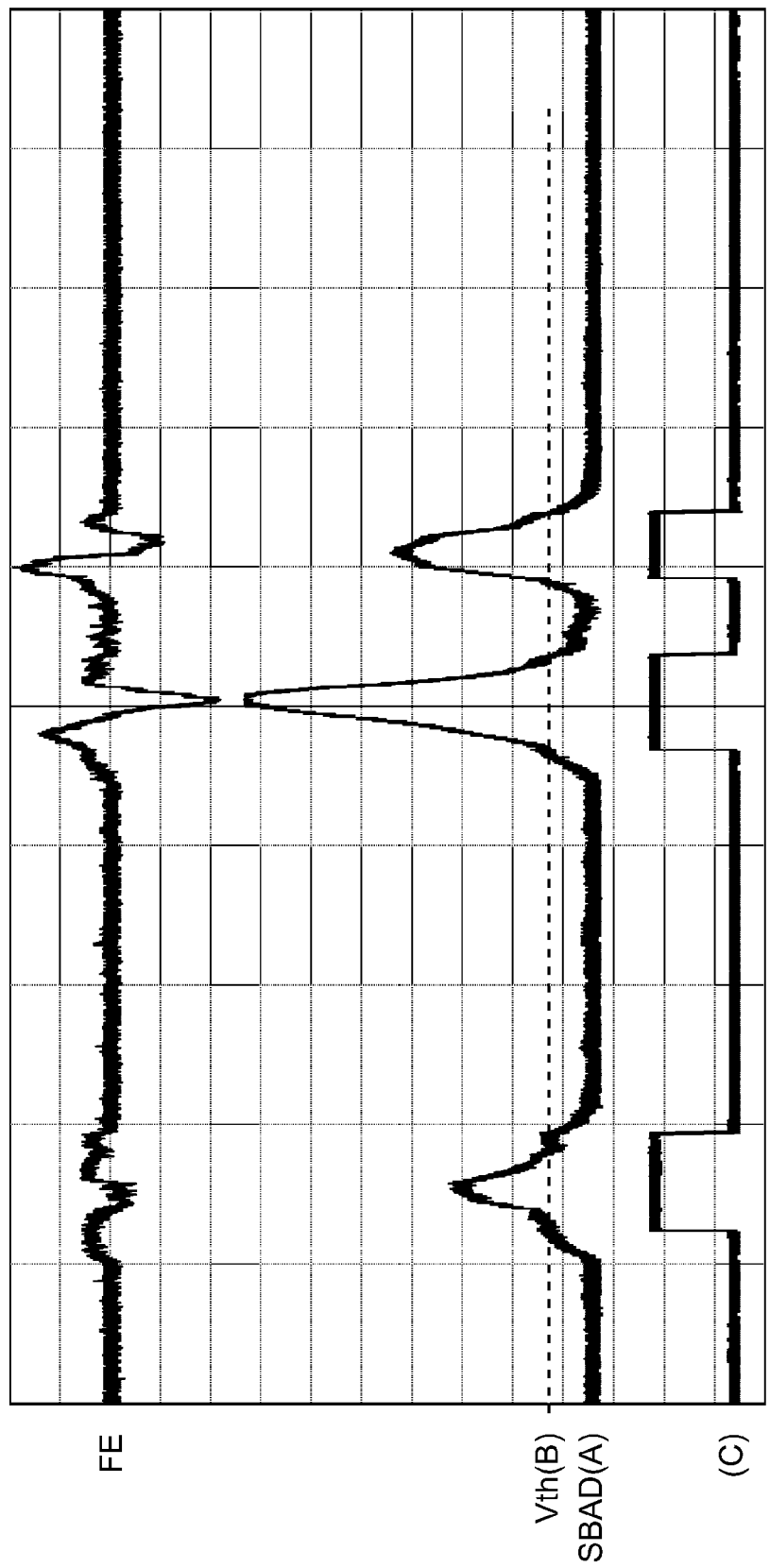
FIG. 8 illustrates practical signals when the optical disc drive adopts the method for determining the number of data layers in an optical disc according to the present invention.

Please refer to FIG. 8, which illustrates practical signals when the optical disc drive adopts the method for determining the number of data layers in an optical disc according to the present invention. Because the reflectivity of the data layer is higher than that of the substrate layer, the SBAD wave peak appeared when the optical disc drive reads the data layer has larger magnitude than the SBAD wave peak appeared when the optical disc drive reads the substrate layer. Except the method shown in the embodiment of FIG. 7, a higher voltage threshold $V_{th}$ can be designated to the SBAD counter. In this manner, the SBAD counter would only respond to the data layer of the optical disc which means the number of the SBAD wave peaks SBAD_cnt is equal to the number of data layers in an optical disc.

Besides, the thickness of the interval between data layers is too large which results from process variation, the read/write quality of the optical disc drive will be affected seriously due to the effect of spherical aberration. Except the focus error signal is shrank and distorted, the magnitude of the SBAD wave peak is also affected which results in that the SBAD counter 520 with the preset threshold voltage $V_{th}$ cannot recognize data layers of the optical disc effectively. In the second embodiment according to the present invention, when reading an optical disc with lager process variation or the optical disc drive is assembled with an optical pickup head which is more sensitive to spherical aberration, the optical disc drive provides a voltage to the astigmatism compensator 114 before it counts the number of SBAD wave peaks. Therefore the most correct number of SBAD wave peaks is obtained.

Figure 9:
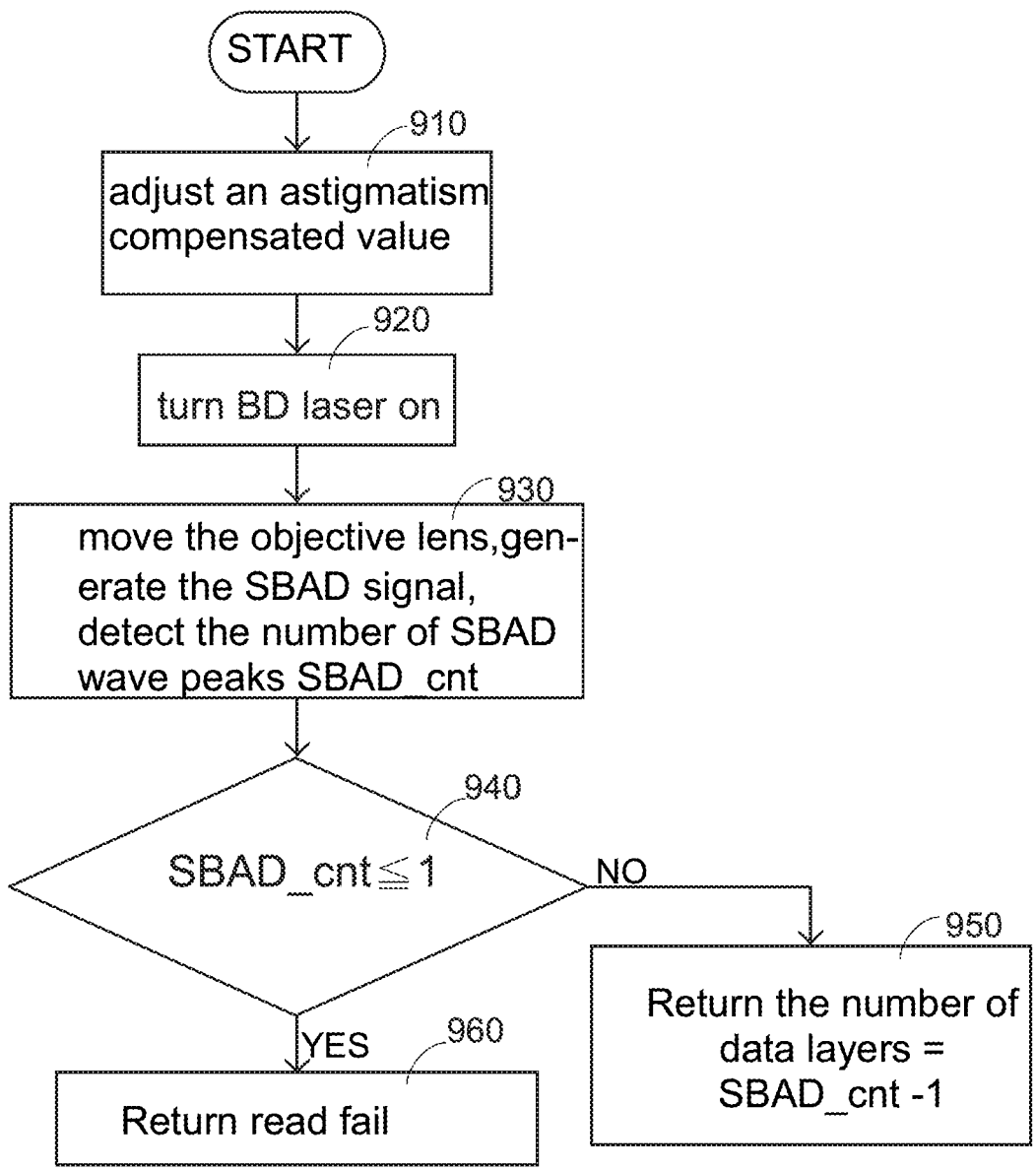
FIG. 9 illustrates a flow chart of the method for determining the number of data layers in an optical disc according to the second embodiment of the present invention

Please refer to FIG. 9, which illustrates a flow chart of the method for determining the number of data layers in an optical disc according to the second embodiment of the present invention.

Step 910: adjust an astigmatism compensated value to a predetermined value.

Step 920: turn on a BD light source.

Step 930: move the objective lens, generate the SBAD signal and detect the number of SBAD wave peaks SBAD_cnt.

Step 940: determine the number of data layers in an optical disc according to the number of SBAD wave peaks SBAD_cnt. If the number of SBAD wave peaks SBAD_cnt is less than 1, proceed step 960, or else proceed step 950.

Step 950: return the number of data layers in an optical disc is equal to the number of SBAD wave peaks SBAD_cnt minus 1.

Step 960: return read fail to the optical disc drive.

Firstly, an astigmatism compensated value is adjusted to a predetermined value. An astigmatism compensated value is for controlling the inputted voltage level of an astigmatism compensator. The astigmatism compensator is usually composed of liquid crystal material. The refractive index of the astigmatism compensator is varied with the inputted voltage level, thus the laser light which passes through the astigmatism compensator is compensated so that the spot shape of the read/write laser light is circular. In this embodiment, an astigmatism compensated value is adjusted to a predetermined value before the optical disc drive counts the number of the SBAD wave peaks, thus the most accurate number of the SBAD wave peaks is obtained. The predetermined value is set to be a middle value between the optimal compensated value SA0 for reading the first data layer L0 and the optimal compensated value SA1 for reading the second data layer L1. The middle value may not always be (SA0+SA1)/2, it also can be obtain according to the SBAD magnitudes for reading the first data layer L0 and for reading the second data layer L1. The object of this step is to approximate the SBAD magnitudes for reading the first data layer L0 and for reading the second data layer L1, thus the SBAD counter may recognize the number of the SBAD wave peaks which represents the number of data layers in an optical disc more effectively.

When the number of SBAD wave peaks SBAD_cnt is less or equal to 1 which represents that the optical disc contains no data layers, the optical disc drive thus returns a read fail message (step 940 and step 960). On the other hand, when the number of SBAD wave peaks SBAD_cnt is larger than 1, the number of data layers in an optical disc is equal to the number of SBAD wave peaks SBAD_cnt minus 1, which excludes the factor of that a small wave peak appeared in the SBAD signal when the optical disc drive detects a substrate layer of the optical disc (step 940 and step 950).

In conclusion, the present invention adopts the sub beam adder signal SBAD or radio frequency signal RF to determine the number of data layers in an optical disc. If adopting the conventional method for determine the number of data layers in an optical disc by counting the number of s-curves, the focus error signal needs to be protected or amplified in advance. However, when the conventional optical disc drive detecting a blu-ray disc, it cannot effectively determine the number of data layers in a blu-ray disc due to the blu-ray system is very sensitive to astigmatism. The present invention thus adopts the SBAD signal (or the RF signal) which are not easily affected by astigmatism and a simple threshold voltage level Vth for determining the number of data layers in an optical disc. The circuits or methods for preventing erroneous determination which result from adopting the FE signal are therefore omitted, and the determining time is also decreased.

Thus, the virtue of the present invention is effectively determining the number of data layers in an optical disc by means of the SBAD signal and without changing any structure of the optical disc drive. The present invention determine the most accurate number of data layers in an optical disc even astigmatism which results from environment variation, ageing of the optical pickup heads, discs played and different customer usage (vertical or horizontal playback) exists. The difficulties of adjusting servo signals are thus decreased so that the read/write quality of the optical storage system is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for an optical disc drive determining data layers in an optical disc comprising:

adjusting an astigmatism compensated value which is inputted to an astigmatism compensator of the optical disc drive to a predetermined value;

moving an objective lens of the optical disc drive and generating a detection signal;

counting the number of wave peaks in the detection signal; and determining the number of data layers in the optical disc based on the number of wave peaks in the detection signal;

wherein the predetermined value is between the optimal compensated value SA0 for reading a first data layer L0 and the optimal compensated value SA1 for reading a second data layer L1.

2. The method as claimed in claim 1, wherein the step of counting the number of wave peaks in the detection signal is counting the number of wave peaks which have magnitude larger than a threshold voltage.

3. The method as claimed in claim 1 further comprises a step of returning read fail to the optical disc drive when the number of wave peaks in the detection signal is less or equal to 1.

4. The method as claimed in claim 1 further comprises a step of determining the number of data layers in the optical disc to be the number of the wave peaks in the detection signal minus 1 when the number of wave peaks in the detection signal is larger than 1.

5. The method as claimed in claim 2, wherein the number of data layers in the optical disc is equal to the number of wave peaks in the detection signal when the threshold voltage is larger than the magnitude of the detection signal generated when the optical disc drive reads a substrate layer of the optical disc.

6. The method as claimed in claim 1, wherein the predetermined value is determined based on the magnitudes of the detection signal for reading a first data layer L0 and for reading a second data layer L1.

7. The method as claimed in claim 1, wherein the detection signal comprises sub beam adder signal SBAD or radio frequency signal RF.

8. An apparatus for determining data layers in an optical disc comprises:
- an optical pickup head which has an astigmatism compensator, an objective lens and a photo detector, wherein the astigmatism compensator is capable of receiving a astigmatism compensated value;
- an control unit which is connected to the optical pickup head for controlling the objective lens moving, receiving a electrical signal from the photo detector and outputting a detection signal;
- a counter for counting the number of wave peaks appeared in the detection signal; and
- a logical operation unit for determining the number of data layers in the optical disc according the counting result of the counter;
- wherein the astigmatism compensated value is adjusted to a predetermined value; and the predetermined value is between the optimal compensated value SA0 for reading a first data layer L0 and the optimal compensated value SA1 for reading a second data layer L1.

9. An apparatus as claimed in claim 8, wherein the counter further comprises a comparator and a pulse counter wherein the comparator compares the wave peak magnitude of the detection signal with a threshold voltage and outputs the compared result to the pulse counter and the pulse counter then outputs the number of wave peaks in the detection signal which has magnitude lager than the threshold voltage.

10. An apparatus as claimed in claim 8, wherein the logical operation unit returns fail when the number of wave peaks in the detection signal is less or equal to 1.

11. An apparatus as claimed in claim 8, wherein the number of data layers in the optical disc is the number of the wave peaks in the detection signal minus 1 when the number of wave peaks in the detection signal is larger than 1.

12. An apparatus as claimed in claim 9, wherein the number of data layers in the optical disc is equal to the number of wave peaks in the detection signal when the threshold voltage is larger than the magnitude of the detection signal generated when reading a substrate layer of the optical disc.

13. An apparatus as claimed in claim 8, wherein the predetermined value is determined based on the magnitudes of the detection signal for reading a first data layer L0 and for reading a second data layer L1.

14. An apparatus as claimed in claim 8, wherein the detection signal comprises sub beam adder signal SBAD or radio frequency signal RF.

15. A method for an optical disc drive determining data layers in an optical disc comprising:
- moving an objective lens of the optical disc drive and generating a detection signal, wherein a plurality of wave peaks are in the detection signal;
- counting the number of wave peaks which have magnitude larger than a threshold voltage; and
- determining the number of data layers in the optical disc to be the number of the wave peaks in the detection signal minus 1 when the number of wave peaks in the detection signal is larger than 1.

16. The method as claimed in claim 15 further comprises a step of returning read fail to the optical disc drive when the number of wave peaks in the detection signal is less or equal to 1.

* * * * *